J. C. BRYAN.
Lightning-Rods.
No. 160,151
Patented Feb. 23, 1875.
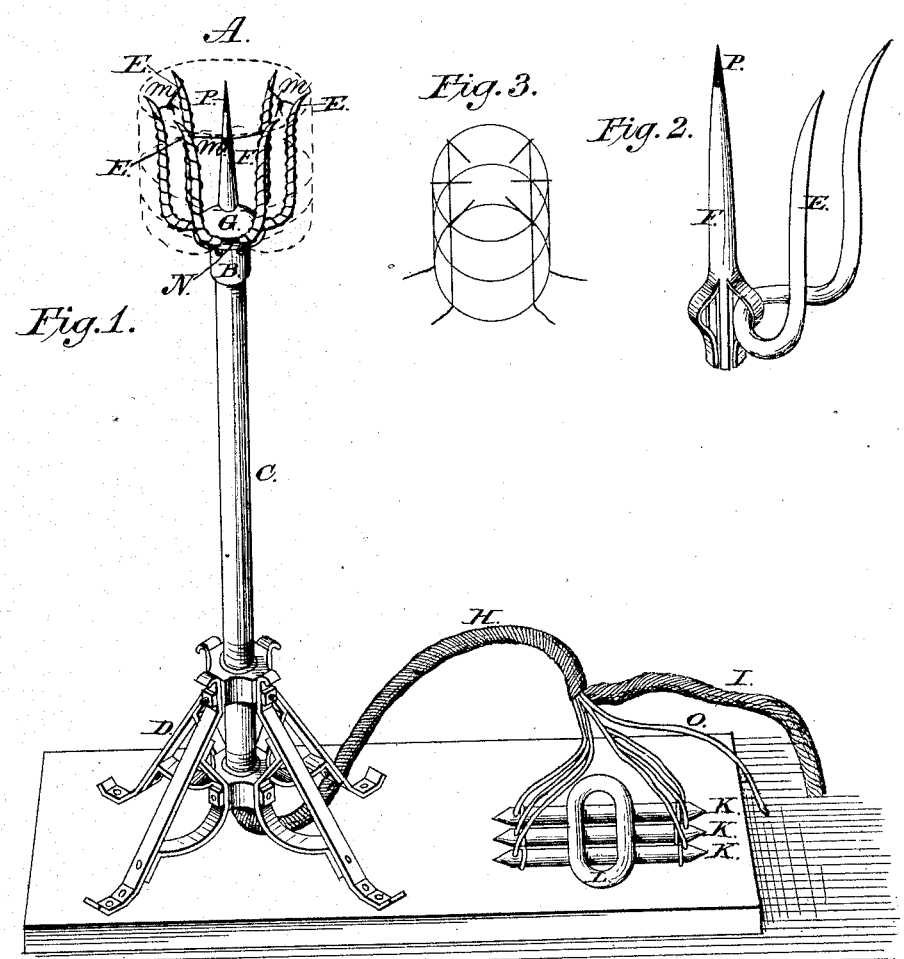

UNITED STATES PATENT OFFICE.

JAMES C. BRYAN, OF PHILADELPHIA, PENNSYLVANIA.

IMPROVEMENT IN LIGHTNING-RODS.

Specification forming part of Letters Patent No. 160,151, dated February 23, 1875; application filed January 27, 1875.

*To all whom it may concern:*

Be it known that I, JAMES CHAPMAN BRYAN, of Philadelphia, State of Pennsylvania, have invented a certain Improvement in Lightning-Rods and Fixtures of the same; I do hereby declare the following to be a full and correct description of the same, reference being had to the accompanying drawings forming a part of this specification.

The object of my invention is to produce a lightning-rod capable of collecting, conveying, and discharging the heaviest charge of electricity.

My invention consists of magnetic batteries applied to the top and bottom of the rod, aiding to collect and disperse the electricity through several points in the atmosphere and earth. They are connected by a rod capable of conveying the heaviest charge of lightning. The rod being surrounded by a protector, I call this the "Magnetic Lightning-Rod."

In describing this rod I will first explain the construction of the magnetic batteries. For the top I take three nickel-plated steel magnets, E, bent, as shown in Figure 2, by and upon a machine invented and patented by me, and a central copper point, F, silver plated, and solid platinum at the tip P, and, placing them in a suitable mold, I cast around their junction a flattened ball, G, of chemically-pure zinc. The under side of this ball is formed with a cavity, the sides or flanges of which project over and down upon the socket B of the hollow standard or staff C, as shown at N, thus preventing the access of water to the interior of the staff. This I call a magnetic battery, and I find that from its construction the parts thereof will not oxidize. For the bottom I take three straight double-pointed and nickel-plated steel magnets, K K K, and, placing them in a suitable mold, unite them by casting around them a ring or circle, L, of chemically-pure zinc. This I designate the magnetic earth-battery. The rod H I make of seven large copper wires, Nos. 9 and 10 wire-gage. These may be twisted together or laid straight. Around them I wrap several small copper wires to cover the surface of the large wires, designated as protector I. I take six of the large wires of the rod H and wrap them in alternate directions around the arms or poles of the horseshoe-magnets E, one wire around each pole. I then unite the two wires passing around the limbs of each magnet, as shown at M, so that the wires act as the keeper for the magnets. The seventh or center H and the protector I pass into and attach to the copper point F. The entire rod H is then passed through the support B, which is provided with cavities for the large wires to pass through B and around G, and then through staff C. This staff is supported by a standard, D, whose construction is fully described and claimed in another application for patent made by me. At the ground end I untwist the rod and taking the central or seventh wire O and protector I pass them to one side and away from the earth magnetic battery, before described. The other six wires I wind around the poles of the earth-magnets K near the ends thereof. This earth-battery is buried several feet below the surface and in a direction coincident with magnetic poles of the earth-battery. In this arrangement the upper magnetic battery serves to collect and disperse any atmospheric current of electricity, while the earth magnetic battery performs the same office for any earth-current, thus causing and maintaining an equilibrium of electrical conditions.

As the points of rods often become encumbered with flags, streamers, kites, &c., I have devised the screen shown in Fig. 3 and dotted lines, Fig. 1, to protect the points from the same. I take iron or brass wire and form it into the shape shown over a wedge-block made for the purpose. The wires are secured together at their points of intersection in any suitable way. This screen or frame is then placed over the upper magnetic battery and fastened at the base of the zinc ball G to the large copper wires of H, and at the top to the magnets at the junction M M M of the wires.

What I claim, and desire to secure by Letters Patent, is—

1. The combination of the curved horseshoe steel magnets E, the wires wound around them and connected at M, the ball of chemically-pure zinc, having cavity N, and the connection of copper point F, substantially as and for the purpose as set forth.

2. The straight steel magnets K, in combination with the ring or circle L of chemically-pure zinc, substantially as and for the purpose set forth.

3. The combination, with the series of magnets K K K and E E E, of the rod H, constructed as described, and provided with the protector I, substantially as and for the purpose set forth.

4. The point-defender, consisting of the wire-net, constructed as set forth, and attached to the upper group of magnetic points, substantially as and for the purpose set forth.

JAMES CHAPMAN BRYAN.

Witnesses:
 JOS. T. K. PLANT,
 THEOPHILUS S. KIMMELL.